(12) United States Patent
Browne et al.

(10) Patent No.: US 7,900,986 B2
(45) Date of Patent: Mar. 8, 2011

(54) ACTIVE MATERIAL BASED CONCEALMENT ASSEMBLIES

(75) Inventors: Alan L. Browne, Grosse Pointe, MI (US); Nancy L. Johnson, Northville, MI (US); Adrian B. Chernoff, Boulder, CO (US); Mark A. Kramarczyk, Sterling Heights, MI (US); Ukpai I. Ukpai, West Bloomfield, MI (US); John C. Ulicny, Oxford, MI (US); Gary L. Jones, Farmington Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 517 days.

(21) Appl. No.: 11/848,466

(22) Filed: Aug. 31, 2007

(65) Prior Publication Data

US 2009/0058132 A1    Mar. 5, 2009

(51) Int. Cl.
    *B60J 9/00*    (2006.01)
(52) U.S. Cl. .................................... 296/1.02; 296/1.07
(58) Field of Classification Search .............. 296/1.02, 296/1.05, 1.07, 1.08; 16/110.1, 412
    See application file for complete search history.

(56) References Cited

U.S. PATENT DOCUMENTS

| | | | |
|---|---|---|---|
| 6,390,878 B1 | 5/2002 | Zhou et al. | |
| 6,431,643 B2 * | 8/2002 | Grey | 296/214 |
| 6,979,050 B2 | 12/2005 | Browne et al. | 296/180.5 |
| 6,991,280 B2 | 1/2006 | McKnight et al. | |
| 7,029,056 B2 | 4/2006 | Browne et al. | |
| 7,059,664 B2 | 6/2006 | Aase et al. | |
| 7,118,652 B2 | 10/2006 | McKnight et al. | 196/180.5 |
| 7,147,269 B2 | 12/2006 | Aase et al. | |
| 7,147,271 B2 | 12/2006 | Aase et al. | |
| 7,178,859 B2 | 2/2007 | Browne et al. | |
| 7,252,313 B2 * | 8/2007 | Browne et al. | 293/128 |
| 7,429,074 B2 * | 9/2008 | Mc Knight et al. | 296/180.1 |
| 7,703,839 B2 | 4/2010 | McKnight et al. | |
| 2004/0031301 A1 | 2/2004 | Dominique | |
| 2004/0195815 A1* | 10/2004 | Browne et al. | 280/753 |
| 2005/0202248 A1 | 9/2005 | Browne et al. | |
| 2006/0186700 A1 | 8/2006 | Browne et al. | 96/187.01 |
| 2008/0133090 A1* | 6/2008 | Browne et al. | 701/49 |
| 2008/0272615 A1 | 11/2008 | McKnight et al. | |

FOREIGN PATENT DOCUMENTS

| | | |
|---|---|---|
| CN | 1890124 A | 1/2007 |
| DE | 112006000418 T5 | 1/2008 |
| EP | 1347131 A1 | 9/2003 |
| WO | 2005060476 A3 | 7/2005 |
| WO | 2006/089261 A2 | 8/2006 |

OTHER PUBLICATIONS

German Office Action for DE 10 2008 040 001.7-21 dated Oct. 16, 2009.

China Office Action dated Jun. 1, 2010 for Chinese Patent Application No. 200810214265.6.

* cited by examiner

*Primary Examiner* — H Gutman
(74) *Attorney, Agent, or Firm* — Cantor Colburn LLP

(57) ABSTRACT

A concealment assembly includes a component, a member configured to have a first form and a second form, wherein the first form is configured to conceal the component and the second form is configured to expose the component, thereby making the component accessible for use, appearance, or function, and an active material in operable communication with the member, wherein the active material is configured to undergo a change in at least one property upon receipt of an activation signal, wherein the change in at least one property is effective to transition the member from the first form to the second form.

13 Claims, 4 Drawing Sheets

ACTIVE MATERIAL BASED CONCEALMENT ASSEMBLIES

BACKGROUND

The present disclosure generally relates to concealment assemblies for covering vehicle components, and in particular concealment assemblies having active materials.

Current vehicles include concealment members. The concealment members can cover, hide, and protect vehicle components. Further, the concealment members can limit inadvertent operation of a vehicle component, can limit access and provide security, increase aerodynamic efficiency of the vehicle, and increase the overall aesthetic appeal of the vehicle.

Current vehicles include concealment members configured to conceal separate vehicle components. Exemplary concealment members configured to conceal separate vehicle components include covers for lights (e.g., headlights, fog lights, parking lights, interior lights, and the like) and interior compartment covers (e.g., glove compartment covers and overhead console compartment covers).

Current vehicles also include vehicle components with integrated concealment features. Exemplary integrated concealment components include handles (e.g., door handles, trunk handles, interior compartment handles, and the like), and input devices (e.g., buttons and switches). Handles have concealment features in that they are disposed in recessed regions and have few protruding portions. Likewise, input devices are also disposed in recess regions and have few protruding portions.

A problem associated with current concealment members is that they are difficult to configure in minimal packaging spaces, comprise several mechanical components, and increase vehicle manufacturing costs. Further, the existing mechanical and/or electrical concealment features can actually impede the intended function of the components. For example, handles designed for concealment can be more difficult to operate than handles not designed for concealment.

Accordingly, there remains a need for improved devices to conceal vehicle components.

BRIEF SUMMARY

Disclosed herein is an active material based concealment assembly in accordance with an exemplary embodiment. In one embodiment, a concealment assembly includes a component, a member configured to have a first form and a second form, wherein the first form is configured to conceal the component and the second form is configured to expose the component, thereby making the component accessible for use, appearance, or function, and an active material in operable communication with the member, wherein the active material is configured to undergo a change in at least one property upon receipt of an activation signal, wherein the change in at least one property is effective to transition the member from the first form to the second form.

In another embodiment, an active material based concealment assembly includes a handle in operative communication with a vehicle swing panel, wherein the handle is configured to permit a user to swingably open the swing panel, a member configured to have a first form and a second form, wherein the first form comprises an abutting surface that is coplanar to the adjacent surface of the vehicle and is configured to conceal the handle, and the second form is not coplanar to the adjacent surface of the vehicle and is configured to expose the handle, and an active material in operable communication with the member, wherein the active material is configured to undergo a change in a property upon receipt of an activation signal, wherein the change in a property is effective to change at least one feature of the member, wherein the change in the at least one feature is effective to transition the member from the first form to the second form.

A method of concealing a component, includes positioning a member about the vehicle component, wherein the member is configured to have a first form and a second form, wherein the first form is configured to conceal the component and the second form is configured to expose the component, activating an active material in operative communication with the member, wherein the active material is configured to undergo a change in at least one property upon receipt of an activation signal, wherein the change in a property is effective to transition the member from the first form to the second form.

BRIEF DESCRIPTION OF THE DRAWINGS

Referring now to the figures, which are exemplary embodiments and wherein the like elements are numbered alike.

FIGS. 1a-1b, wherein FIG. 1a is a perspective view of a vehicle door with door handle and FIG. 1b is a cross-sectional view of the vehicle door handle of FIG. 1a taken along Section A-A';and FIGS. 2a-2f, wherein FIG. 2a is a perspective view of a vehicle door with a door handle and an active material based concealment assembly, FIG. 2b is a cross-sectional view of the vehicle door, door handle and concealment assembly, of FIG. 2a taken along Section B-B' with the concealment assembly in the concealed position, and FIGS. 2c-2f are exemplary embodiments of concealment assemblies that have configurations in the concealed position similar to that of FIG. 2b in their exposed positions, i.e., accessible for use, appearance, or function.

DETAILED DESCRIPTION

Concealment assemblies for covering, protecting, and/or hiding, vehicle components, and methods of their use, are described herein. In contrast to existing concealment assemblies, the concealment assemblies disclosed herein advantageously employ the use of active materials. The concealment assemblies as described comprise an active material which permits the concealment assembly to reversibly expose a component in response to a change in a property of the active material upon receipt of an activation signal. The term "component" as used herein generally refers to any item for which concealment is desirable for household, commercial, automotive, marine, aviation, and other like applications. For example, in automotive applications, a component can include, without limitation, handles, louvers, head lamps, fog lamps, tail lights, sensors, antennas, gauges, control knobs and dials, cup holders, ash trays, audio visual systems, storage compartments, latches, clasps, buttons, key holes, locks, fuel doors, glovebox latches, and the like. The term "active material" as used herein generally refers to a material that exhibits a change in a property such as dimension, shape, phase, orientation, stiffness, and the like upon application of an activation signal. Suitable active materials include, without limitation, shape memory polymers (SMP), shape memory alloys (SMA), ferromagnetic shape memory alloys (MSMA), piezoelectric materials, electroactive polymers (EAP), magnetorheological (MR) elastomers, electrorheological (ER) elastomers, and the like. Depending on the particular active material, the activation signal can take the form of, without limitation, an electric current, an electric field (voltage), a temperature change, a magnetic field, a mechanical loading or stressing, and the like.

Also, as used herein, the terms "first", "second", and the like do not denote any order or importance, but rather are used to distinguish one element from another, and the terms "the", "a", and "an" do not denote a limitation of quantity, but rather denote the presence of at least one of the referenced item. The modifier "about" used in connection with a quantity is inclusive of the stated value and has the meaning dictated by the context (e.g., includes the degree of error associated with measurement of the particular quantity). Furthermore, all ranges disclosed herein are inclusive of the endpoints and independently combinable.

Figure 1B:
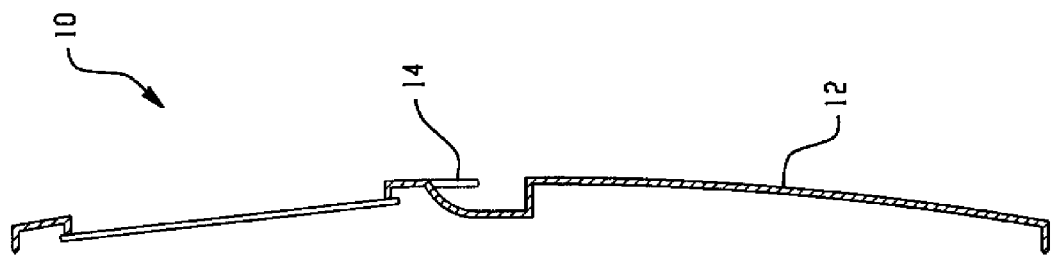
Figure 1A:
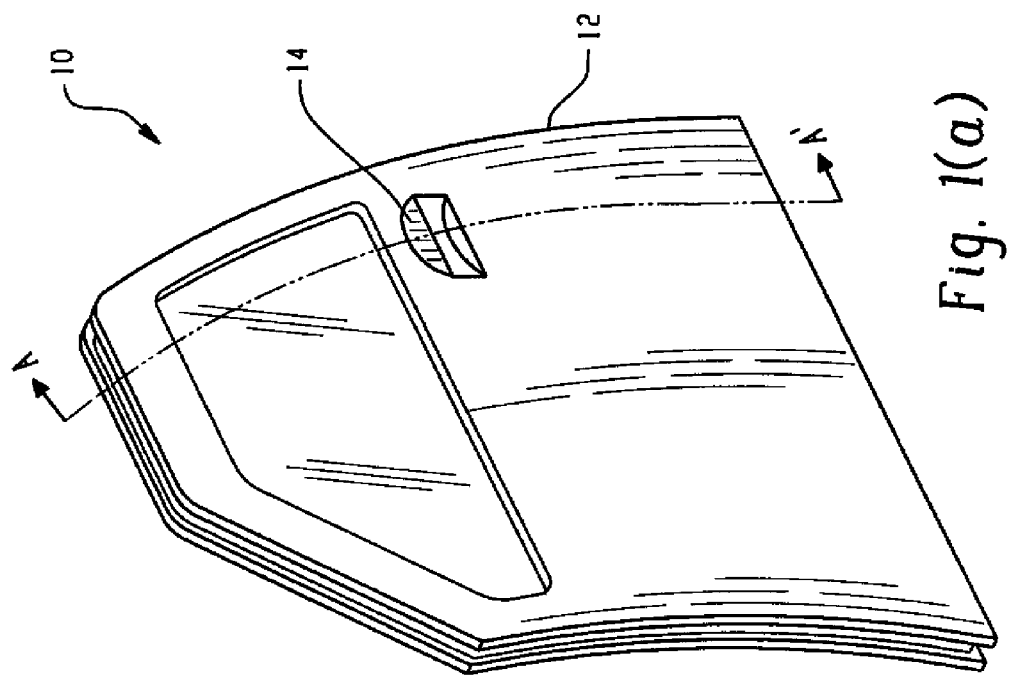

Referring now to FIG. 1, a vehicle having a door with a door handle is shown and generally designated by reference numeral 10. Similar embodiments of the active material based concealment assembly could include components on other swing panels, such as a glove box door, a center console lid, a liftgate, a storage compartment access panel, and the like. FIG. 1(a) provides a perspective view of the door 12 with the handle 14. FIG. 1(b) is a view of the same door 12 taken along the line A-A' to better show the handle 14.

Turning now to FIG. 2, a vehicle door having an exemplary active material based concealment assembly for an exterior door handle is shown and generally designated by reference numeral 50. FIG. 2(a) provides a perspective view of the door 52 with the concealment assembly 54. The concealment assembly 54 comprises the component, in this case the handle 56, and a member 58, which is disposed in physical communication with the handle 56. FIG. 2(b) is a view of the same door 52 taken along the line B-B' to better show the handle 56 and the member 58. While the concealment assembly 54 in this embodiment is used to conceal an exterior vehicle door handle, it is to be understood that the active material based concealment assemblies disclosed herein can be used in combination with any component, such as the automotive components listed above, or components for other applications, such as marine or aviation, where selectively covering, hiding, and/or protecting the component is beneficial.

In this embodiment, the member 58 of the concealment assembly 52 is comprised of an active material. In other embodiments, the active material can be one or more strips (i.e., sections or parts) of active material within the member 58; can be embedded partially or fully within the member 58; or can be a coating or layer on the member 58. Upon receipt of an activation signal, the active material of the member 58 is configured to undergo a change in a property. The change in the property of the active material is effective to change one or more features of the member 58 such as, but not limited to, shape, dimension, location, orientation, stiffness, combinations thereof, and the like. In another embodiment, the active material does not need to be in direct communication with the member 58, rather, the active material can be in operative communication with the member remotely. The change in one or more features of the member 58 caused by the active material could be transferred to the member by connecting mechanisms that can magnify/reduce or otherwise modulate the change in a property of the active material. For example, the active material can serve as an actuator, wherein a mechanical link, such as a rod, shaft, or the like, disposed in operative connection intermediate the active material and the member 58, is adapted to change one or more features of the member in response to the change in a property of the active material. In this manner, it is possible for the active material to be located anywhere in the vehicle, rather than disposed adjacent to and/or as a part of the member 58.

Figure 2B:
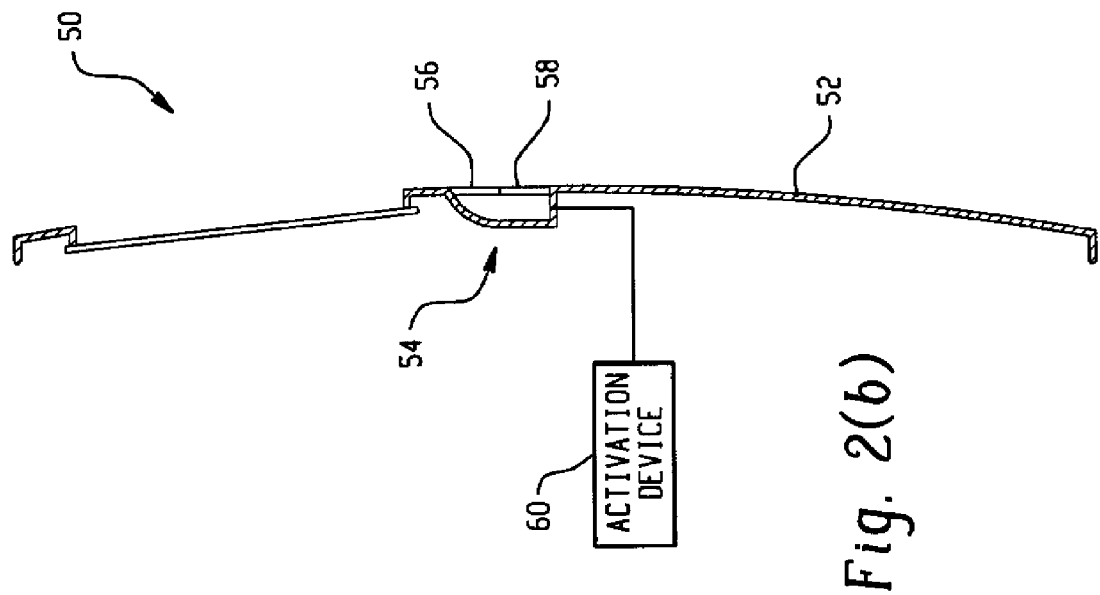
Figure 2A:
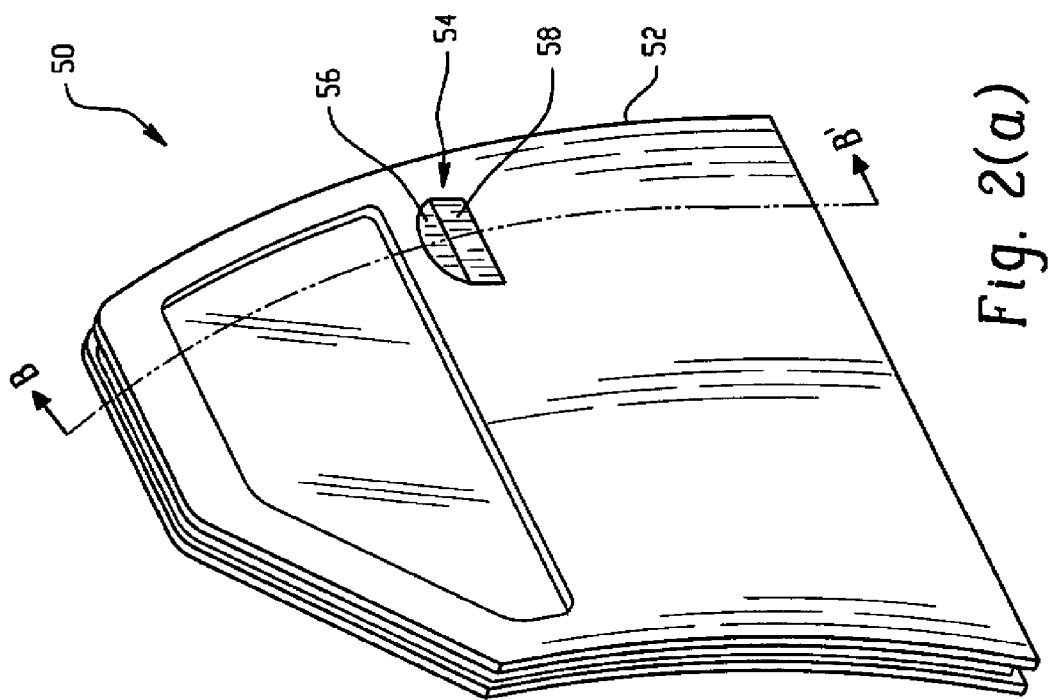
Figure 2D:
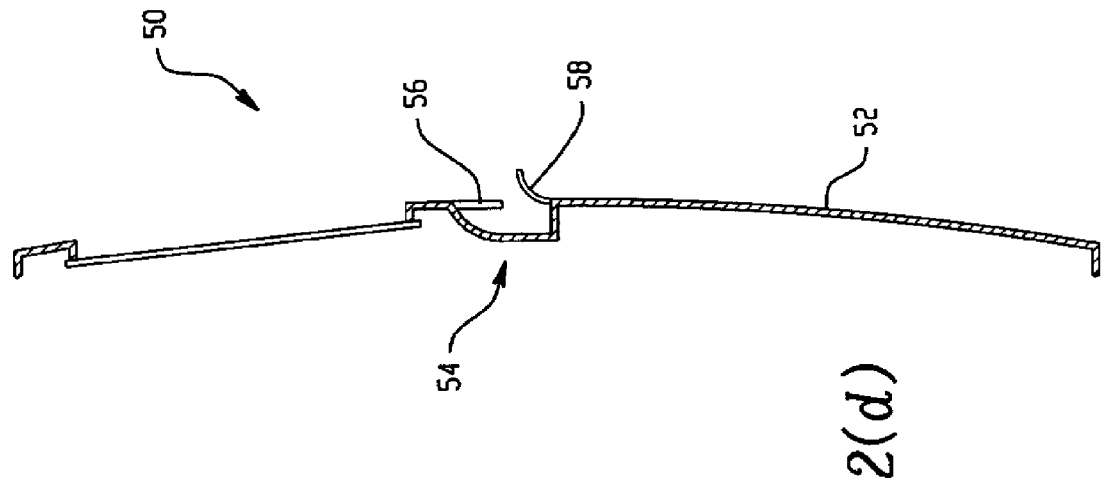
Figure 2C:
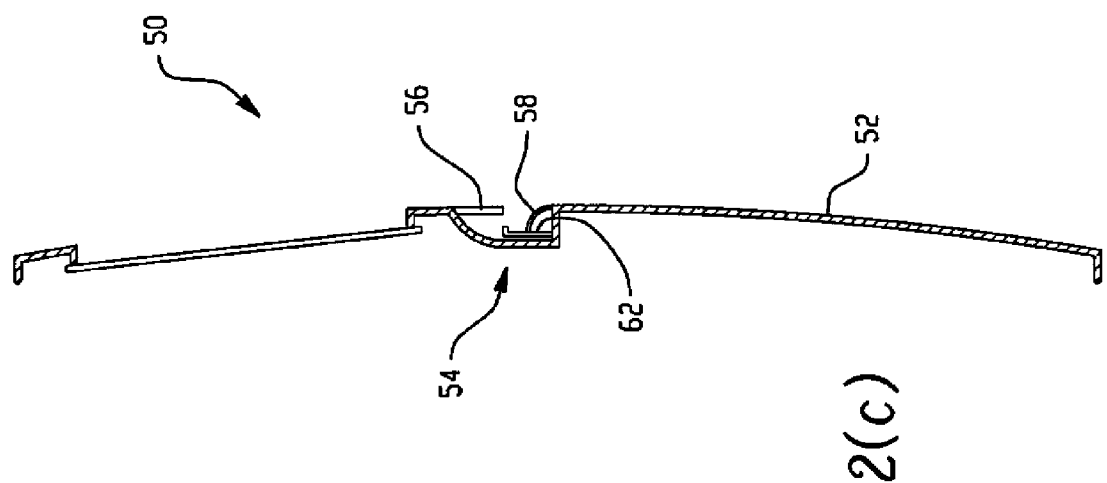

In an exemplary embodiment, the member 58 has a first form, i.e. structure, position, or shape, as shown in FIGS. 2(a) and (b), when the active material is in a passive mode, i.e., when no activation signal is being applied to the active material. The first form of the member 58 comprises a surface that is coplanar to a surface of the vehicle and is configured to conceal the component, in this case the door handle 56. In other embodiments, the member 58 can be disposed on the vehicle component. The door handle 56 as shown is generally intended to be a door handle configured to permit a user to swingably open the vehicle door 52. Upon receipt of an activation signal, the change in a property of the active material is effective to transition the member 58 to a second form, as shown by FIG. 2(c). The second form of the member 58 is not coplanar with the surface of the vehicle and exposes the handle 56, thereby making the component accessible for use, appearance, or function.

Figure 2F:
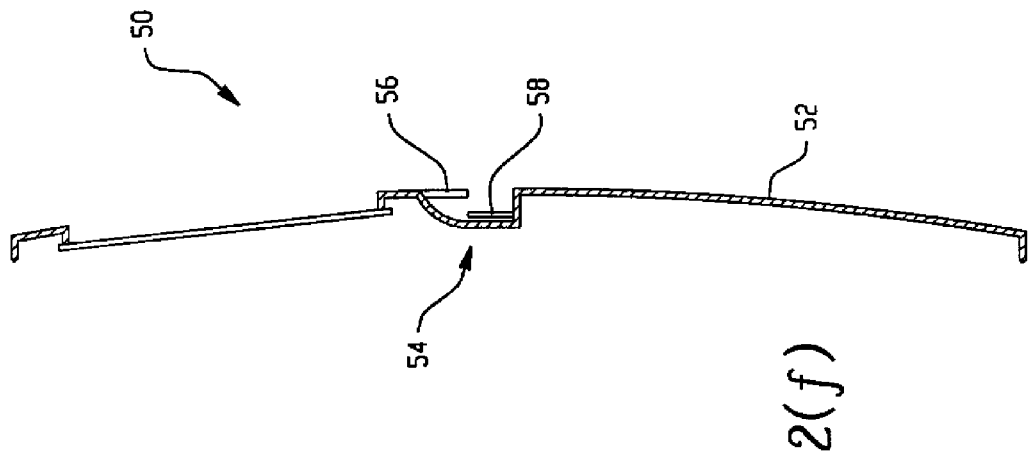
Figure 2E:
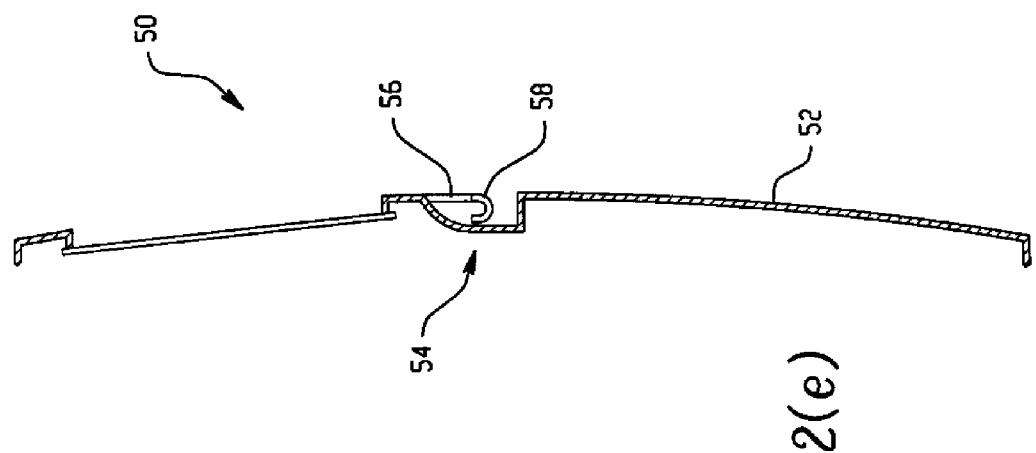

In one embodiment, the stiffness (or modulus) of the active material can change upon receipt of an activation signal. In this case, when the member 58 has the first form, the active material is rigid, thereby holding the member 58 coplanar with the vehicle surface. Upon receipt of the activation signal, the stiffness of the active material is reduced such that the member 58 transitions to the second form providing access to the door handle 56 by a user. The transition by the member 58 can occur in a variety of ways, as shown in FIGS. 2(c)-2(f). In FIGS. 2(c) and (d), the member 58 is attached to the door 52 and the low stiffness of the activated active material causes the member 58 to collapse away from the handle 56. In FIG. 2(c), the member 58 collapses in toward the handle recess of the door. In FIG. 2(d), the member 58 collapses out, away from the handle 56 and the door 52. In FIG. 2(e), the member 58 is attached to the handle 56 and the low stiffness of the active material can permit a user to displace the member 58 as the handle 56 is used. In another embodiment, the member 58 of FIG. 2(e) can comprise a shape memory active material, such as an SMP or SMA, wherein the activation signal is effective to change the shape of the member 58 to that shown. In yet another embodiment, the activation of the active material can be effective to displace the member 58 to a recessed position, as shown in FIG. 2(f).

An activation device 60, as shown in FIG. 2(b), can be coupled to and in operative communication with the concealment assembly 54. The activation device 60 is in functional communication with the concealment assembly 54 and/or the active material, which is operable to selectively provide an activation signal to the concealment assembly 54 and change a feature of the member 58 by changing at least one property of the active material. In an embodiment where two or more concealment assemblies are present on a vehicle, the activation device can be configured to provide one or more activation signals to a selected one or more of the concealment assemblies. For instance, in the case of a concealment assembly for an exterior door handle, the activation device can be configured to first provide the activation signal to the driver's door and, upon further need, activation to the other doors.

The activation signal provided by the activation device 118 can include a heat signal, a magnetic signal, an electrical signal, a pneumatic signal, a mechanical signal, and the like, and combinations comprising at least one of the foregoing signals, with the particular activation signal dependent on the materials and/or configuration of the active material. For instance, a heat signal may be applied for changing the property of the active material fabricated from SMA and/or SMP. An electrical signal may be applied for changing the property of the active material fabricated from electrostrictive materials such as EAP and piezoelectrics, piezoceramics, and piezopolymers. A magnetic field may be applied (removed or changed) for changing the property of the active material fabricated from magnetostrictive materials such as MSMA and MR elastomers.

Desirably, the change in the property of the active material remains for the duration of the applied activation signal. Also desirably, upon discontinuation of the activation signal, the property reverts substantially to its original form prior to the change if no external force is being applied. Conversely, in the case of certain of the active materials such as SMP if the external force and/or load is being applied at the time of deactivation, the property will lock in the new desired form upon deactivation. In this manner, reversibility and multiple resets of the active material based concealment assemblies can advantageously occur. However, in order to restore the active materials, such as SMA and SMP, to their original forms (i.e. wherein the vehicle component is concealed), a return mechanism, such as a bias spring, can be necessary. A return mechanism in operative communication with the active material can be effective transition the active material back to its original form upon discontinuation of the activation signal.

A method of concealing a component is also disclosed. The method first comprises positioning the member 58 in operative communication with the component 56, so as to conceal the component. The active material is in operative communication with the member 58, whether the member is entirely comprised of the active material, the active material comprises portions of the member, the active material is in physical communication with the member, i.e., as a covering or a layer over the member, or the active material is in remote communication with the member. The active material is configured to undergo a change in a property upon receipt of an activation signal. Once positioned, an activation signal is selectively applied to the active material. By selectively introducing the activation signal, the active material undergoes the change in a property, which is effective to change a feature of the member 58 such that the vehicle component 56 is exposed, i.e., accessible for use, appearance, or function. In another embodiment, the method includes discontinuing the activation signal to reverse the change in the property of the active material, and therefore, to reverse the change in the feature of the member 58 such that the vehicle component 56 is once again concealed.

As described above, an activation device can be used to apply the activation signal to the active material in an exemplary concealment assembly. The activation device can be operated in a variety of ways. For example, in one embodiment, use of the remote key fob to unlock a vehicle door could also be configured to initiate the activation signal and cause morphing of the member to reveal the vehicle component, such as a door handle, lock, lights, and the like. Likewise, a wireless signal transmitter in the key fob in combination with an activation device sensor could be used to automatically activate the active material when the key fob is brought into physical proximity to the concealment assembly, thereby eliminating the need to press key fob buttons. In another embodiment, the activation signal could be manually activated. For example, inserting the vehicle key into the door lock or using an interior door handle could activate the activation signal. Similarly, a push button or the like could be disposed adjacent the concealment assembly, wherein depressing the push button activates the activation signal in order to expose the vehicle component. In any of the above methods of activating the active material, the activation signal can be turned off by time-out of a timer in communication with the concealment assembly, or through a sensor in operative communication with the assembly, or through the happening of some event, for example, opening and closing the vehicle door to deactivate the activation signal and return the member to the first form wherein the vehicle component is concealed.

Activation of the active material can also be done manually, i.e., without the use of an activation device. By utilizing particular properties of the active material, the material can be activated by a vehicle operator or passenger. For example, in the instance of SMA, which has a superelastic property and will be discussed in more detail below with the rest of the active materials, pressure on the SMA portion of the concealment assembly could induce a phase change in the SMA, whereby the modulus of the member is lowered enough to be pressed in, which would allow access to a vehicle component, such as a door handle.

Whatever the mode of activation, it is advantageous from a power usage standpoint that the member conceals the vehicle component when in the passive mode. When the member has a first form, concealing the component and no activation signal is being applied to the active material, then no power is required for the continued concealment of the component. In other words, the only power required by the concealment assembly is for the short duration in which the component must be exposed i.e., accessible for use, appearance, or function, such as for the opening of a door in the case of a door handle. If, however, for some reason the vehicle component must be exposed for a longer than normal duration, or if the vehicle component is one in which prolonged exposure is required, for instance vehicle head lamps, then a zero-power hold mechanism can be added to the concealment assembly. The term "zero-power hold mechanism" is intended to mean any device capable of holding the member in the second form, i.e., exposing the vehicle component, after the activation signal has been deactivated and includes, without limitation, a latch, a lock, a stop, and the like. For example, a latch 62 is used as a zero-power hold mechanism for the concealment assembly 54, as shown in FIG. 2(c).

To reiterate, although the active material based concealment assembly 54 of FIGS. 2(a) through 2(f) is shown with respect to a vehicle door handle, it is to be understood that the concealment assembly 54 can be used to conceal any component, wherein concealment for aesthetic, practical, and/or protective purposes is desired. For automotive applications, such suitable concealment assembly uses include, but are not limited to, louvers for lights (e.g., head lamps, fog lamps, turn signals, parking lights, and the like), flaps for sensors (e.g., backup, night vision, phone antennae, satellite radio antennae, dashboard and the like), cover flaps for handles/hooks (e.g., door, trunk, hood, tailgate, garment, and the like), cover flaps for headliner storage, glove boxes, audio/visual systems, and the like, and other components where concealment may be desired on motor vehicles, boats, airplanes, in commercial or residential buildings, and the like.

As previously described, suitable active materials for the concealment assemblies include, without limitation, shape memory polymers (SMP), shape memory alloys (SMA), electroactive polymers (EAP), piezoelectric materials, ferromagnetic shape memory alloys, magnetorheological (MR) elastomers and electrorheological (ER) elastomers.

"Shape memory polymer" generally refers to a polymeric material, which exhibits a change in a property, such as an elastic modulus, a shape, a dimension, a shape orientation, or a combination comprising at least one of the foregoing properties upon application of an activation signal. Shape memory polymers may be thermoresponsive (i.e., the change in the property is caused by a thermal activation signal), photoresponsive (i.e., the change in the property is caused by a light-based activation signal), moisture-responsive (i.e., the change in the property is caused by a liquid activation signal such as humidity, water vapor, or water), or a combination comprising at least one of the foregoing.

Generally, SMP are phase segregated co-polymers comprising at least two different units, which may be described as defining different segments within the SMP, each segment contributing differently to the overall properties of the SMP. As used herein, the term "segment" refers to a block, graft, or sequence of the same or similar monomer or oligomer units, which are copolymerized to form the SMP. Each segment may be crystalline or amorphous and will have a corresponding melting point or glass transition temperature (Tg), respectively. The term "thermal transition temperature" is used herein for convenience to generically refer to either a Tg or a melting point depending on whether the segment is an amorphous segment or a crystalline segment. For SMP comprising (n) segments, the SMP is said to have a hard segment and (n−1) soft segments, wherein the hard segment has a higher thermal transition temperature than any soft segment. Thus, the SMP has (n) thermal transition temperatures. The thermal transition temperature of the hard segment is termed the "last transition temperature", and the lowest thermal transition temperature of the so-called "softest" segment is termed the "first transition temperature". It is important to note that if the SMP has multiple segments characterized by the same thermal transition temperature, which is also the last transition temperature, then the SMP is said to have multiple hard segments.

When the SMP is heated above the last transition temperature, the SMP material can be imparted a permanent shape. A permanent shape for the SMP can be set or memorized by subsequently cooling the SMP below that temperature. As used herein, the terms "original shape", "previously defined shape", and "permanent shape" are synonymous and are intended to be used interchangeably. A temporary shape can be set by heating the material to a temperature higher than a thermal transition temperature of any soft segment yet below the last transition temperature, applying an external stress or load to deform the SMP, and then cooling below the particular thermal transition temperature of the soft segment while maintaining the deforming external stress or load.

The permanent shape can be recovered by heating the material, with the stress or load removed, above the particular thermal transition temperature of the soft segment yet below the last transition temperature. Thus, it should be clear that by combining multiple soft segments it is possible to demonstrate multiple temporary shapes and with multiple hard segments it may be possible to demonstrate multiple permanent shapes. Similarly using a layered or composite approach, a combination of multiple SMPs will demonstrate transitions between multiple temporary and permanent shapes.

For SMP with only two segments, the temporary shape of the shape memory polymer is set at the first transition temperature, followed by cooling of the SMP, while under load, to lock in the temporary shape. The temporary shape is maintained as long as the SMP remains below the first transition temperature. The permanent shape is regained when the SMP is once again brought above the first transition temperature with the load removed. Repeating the heating, shaping, and cooling steps can repeatedly reset the temporary shape.

Most SMP exhibit a "one-way" effect, wherein the SMP exhibits one permanent shape. Upon heating the shape memory polymer above a soft segment thermal transition temperature without a stress or load, the permanent shape is achieved and the shape will not revert back to the temporary shape without the use of outside forces.

As an alternative, some shape memory polymer compositions can be prepared to exhibit a "two-way" effect, wherein the SMP exhibits two permanent shapes. These systems include at least two polymer components. For example, one component could be a first cross-linked polymer while the other component is a different cross-linked polymer. The components are combined by layer techniques, or are interpenetrating networks, wherein the two polymer components are cross-linked but not to each other. By changing the temperature, the shape memory polymer changes its shape in the direction of a first permanent shape or a second permanent shape. Each of the permanent shapes belongs to one component of the SMP. The temperature dependence of the overall shape is caused by the fact that the mechanical properties of one component ("component A") are almost independent of the temperature in the temperature interval of interest. The mechanical properties of the other component ("component B") are temperature dependent in the temperature interval of interest. In one embodiment, component B becomes stronger at low temperatures compared to component A, while component A is stronger at high temperatures and determines the actual shape. A two-way memory device can be prepared by setting the permanent shape of component A ("first permanent shape"), deforming the device into the permanent shape of component B ("second permanent shape"), and fixing the permanent shape of component B while applying a stress.

It should be recognized by one of ordinary skill in the art that it is possible to configure SMP in many different forms and shapes. Engineering the composition and structure of the polymer itself can allow for the choice of a particular temperature for a desired application. For example, depending on the particular application, the last transition temperature may be about 0° C. to about 300° C. or above. A temperature for shape recovery (i.e., a soft segment thermal transition temperature) may be greater than or equal to about −30° C. Another temperature for shape recovery may be greater than or equal to about 40° C. Another temperature for shape recovery may be greater than or equal to about 100° C. Another temperature for shape recovery may be less than or equal to about 250° C. Yet another temperature for shape recovery may be less than or equal to about 200° C. Finally, another temperature for shape recovery may be less than or equal to about 150° C.

Optionally, the SMP can be selected to provide stress-induced yielding, which may be used directly (i.e. without heating the SMP above its thermal transition temperature to 'soften' it) to make the pad conform to a given surface. The maximum strain that the SMP can withstand in this case can, in some embodiments, be comparable to the case when the SMP is deformed above its thermal transition temperature.

Although reference has been, and will further be, made to thermoresponsive SMP, those skilled in the art in view of this disclosure will recognize that photoresponsive, moisture-responsive SMP and SMP activated by other methods may readily be used in addition to or substituted in place of thermoresponsive SMP. For example, instead of using heat, a temporary shape may be set in a photoresponsive SMP by irradiating the photoresponsive SMP with light of a specific wavelength (while under load) effective to form specific crosslinks and then discontinuing the irradiation while still under load. To return to the original shape, the photoresponsive SMP may be irradiated with light of the same or a different specific wavelength (with the load removed) effective to cleave the specific crosslinks. Similarly, a temporary shape can be set in a moisture-responsive SMP by exposing specific functional groups or moieties to moisture (e.g., humidity, water, water vapor, or the like) effective to absorb a specific amount of moisture, applying a load or stress to the moisture-responsive SMP, and then removing the specific amount of moisture while still under load. To return to the original shape, the moisture-responsive SMP may be exposed to moisture (with the load removed).

Suitable shape memory polymers, regardless of the particular type of SMP, can be thermoplastics, thermosets-thermoplastic copolymers, interpenetrating networks, semi-interpenetrating networks, or mixed networks. The SMP "units" or "segments" can be a single polymer or a blend of polymers. The polymers can be linear or branched elastomers with side chains or dendritic structural elements. Suitable polymer components to form a shape memory polymer include, but are not limited to, polyphosphazenes, poly(vinyl alcohols), polyamides, polyimides, polyester amides, poly (amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), poly(butyl methacrylate), poly(isobutyl methacrylate), poly(hexyl methacrylate), poly(isodecyl methacrylate), poly (lauryl methacrylate), poly(phenyl methacrylate), poly(methyl acrylate), poly(isopropyl acrylate), poly(isobutyl acrylate) and poly(octadecylacrylate). Examples of other suitable polymers include polystyrene, polypropylene, polyvinyl phenol, polyvinylpyrrolidone, chlorinated polybutylene, poly (octadecyl vinyl ether), poly (ethylene vinyl acetate), polyethylene, poly(ethylene oxide)-poly(ethylene terephthalate), polyethylene/nylon (graft copolymer), polycaprolactones-polyamide (block copolymer), poly(caprolactone) diniethacrylate-n-butyl acrylate, poly(norbornyl-polyhedral oligomeric silsequioxane), polyvinylchloride, urethane/butadiene copolymers, polyurethane-containing block copolymers, styrene-butadiene block copolymers, and the like. The polymer(s) used to form the various segments in the SMPs described above are either commercially available or can be synthesized using routine chemistry. Those of skill in the art can readily prepare the polymers using known chemistry and processing techniques without undue experimentation.

As will be appreciated by those skilled in the art, conducting polymerization of different segments using a blowing agent can form a shape memory polymer foam, for example, as may be desired for some applications. The blowing agent can be of the decomposition type (evolves a gas upon chemical decomposition) or an evaporation type (which vaporizes without chemical reaction). Exemplary blowing agents of the decomposition type include, but are not intended to be limited to, sodium bicarbonate, azide compounds, ammonium carbonate, ammonium nitrite, light metals which evolve hydrogen upon reaction with water, azodicarbonamide, N, N' dinitrosopentamethylenetetramine, and the like. Exemplary blowing agents of the evaporation type include, but are not intended to be limited to, trichloromonofluoromethane, trichlorotrifluoroethane, methylene chloride, compressed nitrogen, and the like.

Similar to shape memory polymers, shape memory alloys exist in several different temperature-dependent phases. The most commonly utilized of these phases are the so-called martensite and austenite phases. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature (As). The temperature at which this phenomenon is complete is called the austenite finish temperature (Af). When the shape memory alloy is in the austenite phase and is cooled, it begins to change into the martensite phase, and the temperature at which this phenomenon starts is referred to as the martensite start temperature (Ms). The temperature at which austenite finishes transforming to martensite is called the martensite finish temperature (Mf). Generally, the shape memory alloys are softer and more easily deformable in their martensitic phase and are harder, stiffer, and/or more rigid in the austenitic phase. In view of the foregoing properties, expansion of the shape memory alloy is preferably at or below the austenite transition temperature (at or below As). Subsequent heating above the austenite transition temperature causes the expanded shape memory alloy to revert back to its permanent shape. Thus, a suitable activation signal for use with shape memory alloys is a thermal activation signal having a magnitude to cause transformations between the martensite and austenite phases.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing shape memory effects, superelastic effects, and high damping capacity.

Suitable shape memory alloy materials include, but are not intended to be limited to, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The alloys can be binary, ternary, or any higher order so long as the alloy composition exhibits a shape memory effect, e.g., change in shape orientation, changes in yield strength, and/or flexural modulus properties, damping capacity, superelasticity, and the like. Selection of a suitable shape memory alloy composition depends on the temperature range where the component will operate.

Ferromagnetic Shape Memory Alloys (FSMA) are a subclass of SMA. FSMA can behave like conventional SMA materials that have a stress or thermally induced phase transformation between martensite and austenite. Additionally FSMA are ferromagnetic and have strong magnetocrystalline anisotropy, which permit an external magnetic field to influence the orientation/fraction of field aligned martensitic variants. When the magnetic field is removed, the material may exhibit complete two-way, partial two-way or one-way shape memory. For partial or one-way shape memory, an external stimulus, temperature, magnetic field or stress may permit the material to return to its starting state. Perfect two-way shape memory may be used for proportional control with continuous power supplied. One-way shape memory is most useful for latching-type applications where a delayed return stimulus permits a latching function. External magnetic fields are generally produced via soft-magnetic core electromagnets in automotive applications, though a pair of Helmholtz coils may also be used for fast response.

Exemplary ferromagnetic shape memory alloys are nickel-manganese-gallium based alloys, iron-platinum based alloys, iron-palladium based alloys, cobalt-nickel-aluminum based alloys, cobalt-nickel-gallium based alloys. Like SMA these alloys can be binary, ternary, or any higher order so long as the alloy composition exhibits a shape memory effect, e.g., change in shape, orientation, yield strength, flexural modulus, damping capacity, superelasticity, and/or similar properties. Selection of a suitable shape memory alloy composition depends, in part, on the temperature range and the type of response in the intended application.

FSMA are alloys; often composed of Ni—Mn—Ga, that change shape due to strain induced by a magnetic field. FSMA have internal variants with different magnetic and crystallographic orientations. In a magnetic field, the proportions of these variants change, resulting in an overall shape change of the material. An FSMA actuator generally requires that the FSMA material be placed between coils of an electromagnet. Electric current running through the coil induces a magnetic field through the FSMA material, causing a change in shape.

Electroactive polymers include those polymeric materials that exhibit piezoelectric, pyroelectric, or electrostrictive properties in response to electrical or mechanical fields. An example of an electrostrictive-grafted elastomer with a piezoelectric poly(vinylidene fluoride-trifluoro-ethylene) copolymer. This combination has the ability to produce a varied amount of ferroelectric-electrostrictive molecular composite systems. These may be operated as a piezoelectric sensor or even an electrostrictive actuator.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as high electrical breakdown strength, a low modulus of elasticity (for large or small deformations), a high dielectric constant, and the like. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thicknesses suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present disclosure may vary. Suitable materials used in an electrode may include graphite, carbon black, colloidal suspensions, and thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

Suitable piezoelectric materials include, but are not intended to be limited to, inorganic compounds, organic compounds, and metals. With regard to organic materials, all of the polymeric materials with non-centrosymmetric structure and large dipole moment group(s) on the main chain or on the side-chain, or on both chains within the molecules, can be used as suitable candidates for the piezoelectric film. Exemplary polymers include, for example, but are not limited to, poly(sodium 4-styrenesulfonate), poly(poly(vinylamine) backbone azo chromophore), and their derivatives; polyfluorocarbons, including polyvinylidenefluoride, its co-polymer vinylidene fluoride ("VDF"), co-trifluoroethylene, and their derivatives; polychlorocarbons, including poly(vinyl chloride), polyvinylidene chloride, and their derivatives; polyacrylonitriles, and their derivatives; polycarboxylic acids, including poly(methacrylic acid), and their derivatives; polyureas, and their derivatives; polyurethanes, and their derivatives; bio-molecules such as poly-L-lactic acids and their derivatives, and cell membrane proteins, as well as phosphate bio-molecules such as phosphodilipids; polyanilines and their derivatives, and all of the derivatives of tetramines; polyamides including aromatic polyamides and polyimides, including Kapton and polyetherimide, and their derivatives; all of the membrane polymers; poly(N-vinyl pyrrolidone) (PVP) homopolymer, and its derivatives, and random PVP-co-vinyl acetate copolymers; and all of the aromatic polymers with dipole moment groups in the main-chain or side-chains, or in both the main-chain and the side-chains, and mixtures thereof.

Piezoelectric material can also comprise metals selected from the group consisting of lead, antimony, manganese, tantalum, zirconium, niobium, lanthanum, platinum, palladium, nickel, tungsten, aluminum, strontium, titanium, barium, calcium, chromium, silver, iron, silicon, copper, alloys comprising at least one of the foregoing metals, and oxides comprising at least one of the foregoing metals. Suitable metal oxides include $SiO_2$, $Al_2O_3$, $ZrO_2$, $TiO_2$, $SrTiO_3$, $PbTiO_3$, $BaTiO_3$, $FeO_3$, $Fe_3O_4$, ZnO, and mixtures thereof and Group VIA and IIB compounds, such as CdSe, CdS, GaAs, $AgCaSe_2$, ZnSe, GaP, InP, ZnS, and mixtures thereof. Preferably, the piezoelectric material is selected from the group consisting of polyvinylidene fluoride, lead zirconate titanate, and barium titanate, and mixtures thereof.

Magnetorheological (MR) elastomers are a group of smart materials whose modulus can be controlled by the application of an external magnetic field. MR elastomer materials include, but are not intended to be limited to, an elastic polymer matrix comprising a suspension of ferromagnetic or paramagnetic particles. Suitable particles include iron; iron alloys, such as those including aluminum, silicon, cobalt, nickel, vanadium, molybdenum, chromium, tungsten, manganese and/or copper; iron oxides, including Fe2O3 and Fe3O4; iron nitride; iron carbide; carbonyl iron; nickel and alloys of nickel; cobalt and alloys of cobalt; chromium dioxide; stainless steel; silicon steel; and the like.

The particle size should be selected so that the particles exhibit multiple magnetic domain characteristics when subjected to a magnetic field. Diameter sizes for the particles can be less than or equal to about 1,000 micrometers, with less than or equal to about 500 micrometers preferred, and less than or equal to about 100 micrometers more preferred. Also preferred is a particle diameter of greater than or equal to about 0.1 micrometer, with greater than or equal to about 0.5 more preferred, and greater than or equal to about 10 micrometers especially preferred. The particles are preferably present in an amount between about 5.0 to about 50 percent by volume of the total MR elastomer composition.

Suitable polymer matrices include, but are not limited to, poly-alpha-olefins, natural rubber, silicone, polybutadiene, polyethylene, polyisoprene, and the like.

The application and functionality of the concealment assembly will determine which active material is best suited for the particular assembly. Factors such as force, displacement, actuation time, and the like can be used to determine which type of active material is most appropriate. For instance, where an application requires an activation time of about 1 second or greater, an SMA or SMP can be appropriate. Where an application requires shorter activation times, an EAP or MR elastomer can be used.

As stated above, the concealment assemblies as disclosed herein advantageously employ active materials to reversibly expose and conceal a component. The active material based concealment assemblies are lightweight, inherently robust, lower in complexity than existing concealment assemblies (which can have multiple mechanical and/or electrical components prone to failure), and produce little to no noise. Utilizing active materials to affect the feature changes of the cover member provides devices of increased simplicity, while reducing assembly volume and the energy requirements for activation due to higher energy densities. Moreover, the concealment assemblies described herein are also of low-cost and of easily adaptable design that can be integrated with limited changes to the existing structure.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A concealment assembly comprising:
   a component disposed on a swingable swing panel of a vehicle;
   a member configured to have a first form and a second form, wherein the first form comprises a surface that is coplanar to a surface of the vehicle and a surface of the component and is configured to conceal the component and the second form is not coplanar to the surface of the vehicle or the surface of the component and is configured to expose the component, thereby making the component accessible for use, appearance, or function; and
   an active material in operable communication with the member, wherein the active material is configured to undergo a change in at least one property upon receipt of an activation signal, wherein the change in at least one property is effective to transition the member from the first form to the second form.

2. The concealment assembly of claim 1, wherein the active material comprises a shape memory alloy, a ferromagnetic shape memory alloy, a shape memory polymer, a magnetorheological elastomer, an electrorheological elastomer, an electroactive polymer, a piezoelectric material, or a combination comprising at least two of the foregoing active materials.

3. The concealment assembly of claim 1, wherein the change in the at least one property comprises a change in a shape, a dimension, a phase, a shape orientation, a stiffness, or a combination comprising at least two of the foregoing properties.

4. The concealment assembly of claim 1, wherein the activation signal comprises a thermal activation signal, an electric activation signal, a magnetic activation signal, a chemical activation signal, a mechanical load, or a combination comprising at least two of the foregoing activation signals.

5. The concealment assembly of claim 1, wherein the component is selected from the group consisting of a handle, louver, head lamp, fog lamp, tail light, sensor, antenna, gauge, control knob, cup holder, ash tray, audio visual system, storage compartment, latch, clasp, button, key hole, lock, fuel door, and glove box latch.

6. The concealment assembly of claim 1, further comprising an activation device configured to provide the activation signal to the active material.

7. The concealment assembly of claim 1, further comprising a zero-power hold mechanism configured to hold the member in the second form upon deactivation of the activation signal.

8. The concealment assembly of claim 1, wherein the member is formed of the active material.

9. The concealment assembly of claim 1, wherein the active material is embedded in the member.

10. The concealment assembly of claim 1, wherein the active material comprises a coating layer disposed on the member.

11. The concealment assembly of claim 1, wherein the active material is in remote operable communication with the member.

12. A concealment assembly for a vehicle, comprising:
    a handle in operative communication with a vehicle swing panel, wherein the handle is configured to permit a user to swingably open the swing panel;

a member configured to have a first form and a second form, wherein the first form comprises an abutting surface that is coplanar to a surface of the vehicle and a surface of the handle and is configured to conceal the handle, and the second form is not coplanar to the surface of the vehicle or the surface of the handle and is configured to expose the handle; and an active material in operable communication with the member, wherein the active material is configured to undergo a change in a property upon receipt of an activation signal, wherein the change in a property is effective to change at least one feature of the member, wherein the change in the at least one feature is effective to transition the member from the first form to the second form.

13. The concealment assembly of claim 12, further comprising an activation device configured to provide the activation signal to the active material.

* * * * *